United States Patent

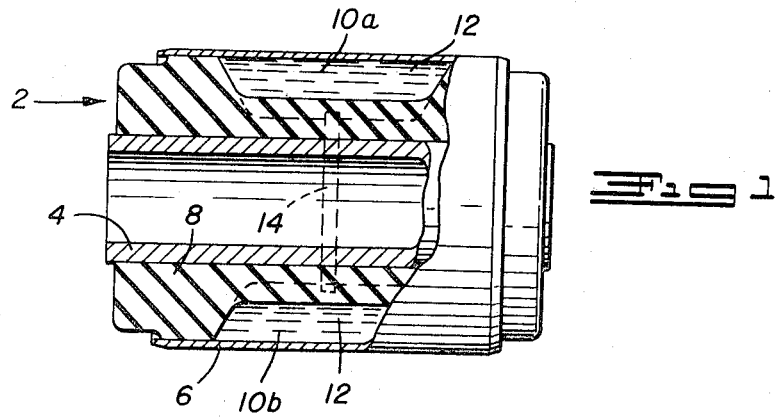
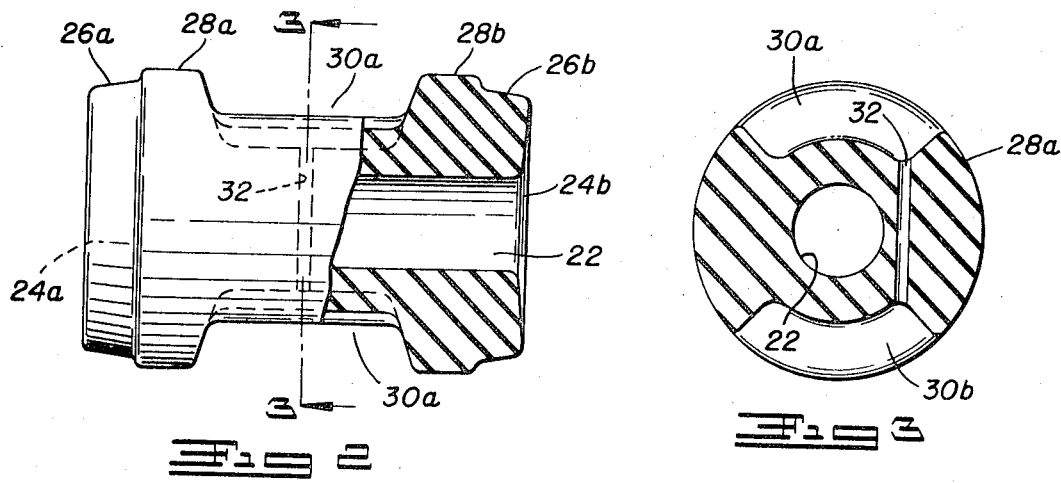
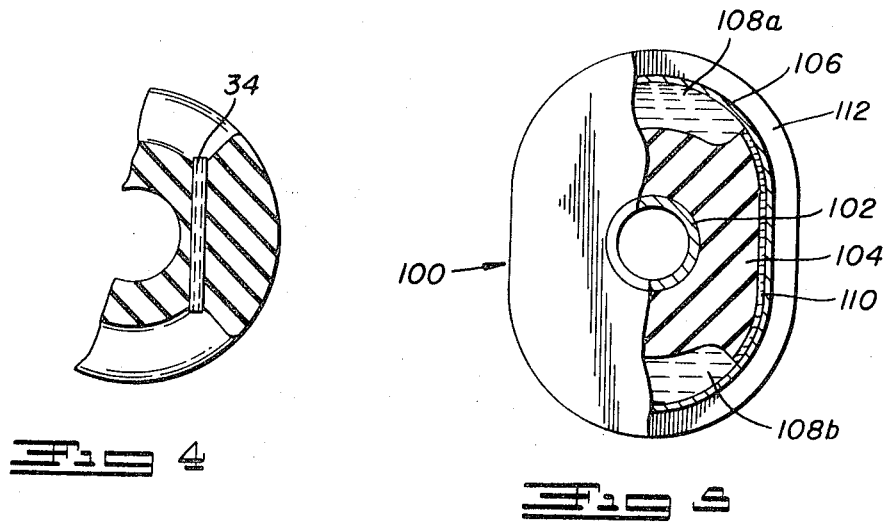

Hipsher

[15] 3,642,268
[45] Feb. 15, 1972

[54] HIGH-DAMPING RESILIENT BUSHING

[72] Inventor: Gary L. Hipsher, Logansport, Ind.
[73] Assignee: The General Tire & Rubber Company
[22] Filed: June 12, 1970
[21] Appl. No.: 45,740

Related U.S. Application Data

[63] Continuation-in-part of Ser. No. 755,268, Aug. 26, 1968, abandoned.

[52] U.S. Cl. .................................................. 267/57.1
[51] Int. Cl. ................................................... B60g 11/62
[58] Field of Search ........................... 267/57.1 A, 57.1 R

[56] References Cited

UNITED STATES PATENTS 3,147,964  9/1964  Wolf ............................... 267/57.1 A
3,055,687  9/1962  Hutton ............................ 267/57.1

*Primary Examiner*—James B. Marbert
*Attorney*—Frank C. Rote, Jr. and Harry F. Pepper, Jr.

[57] ABSTRACT

A resilient bushing is composed of inner and outer rigid concentric sleeves and a molded elastomeric insert radially compressed therebetween, said insert containing a pair of recesses that cooperate with the outer sleeve to form fluid-containing reservoirs or pockets. The reservoirs contain a fluid such as silicone oil and are in fluid communication with one another through a suitable tube or orifice. When the bushing is deflected in a radial direction through the pockets, the fluid provides high damping in that radial direction for increased vibration isolation. Various types of orifices or tubes can be used to vary the damping properties of the bushing.

16 Claims, 10 Drawing Figures

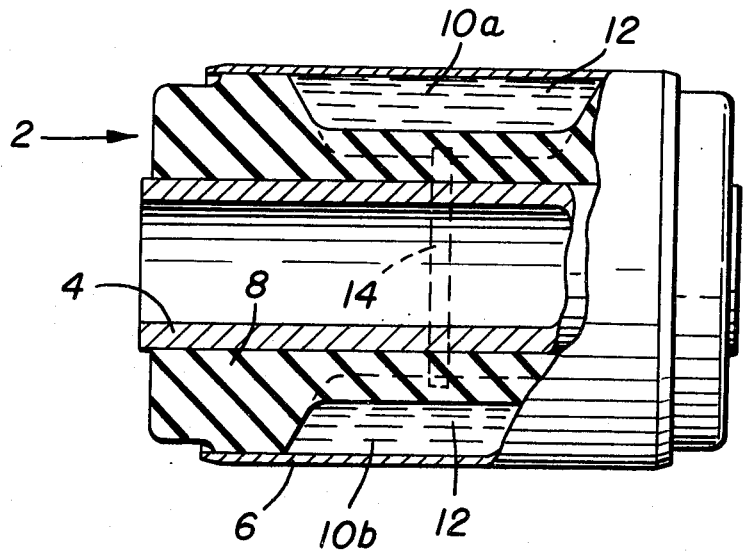

PATENTED FEB 15 1972 3,642,268
SHEET 2 OF 2
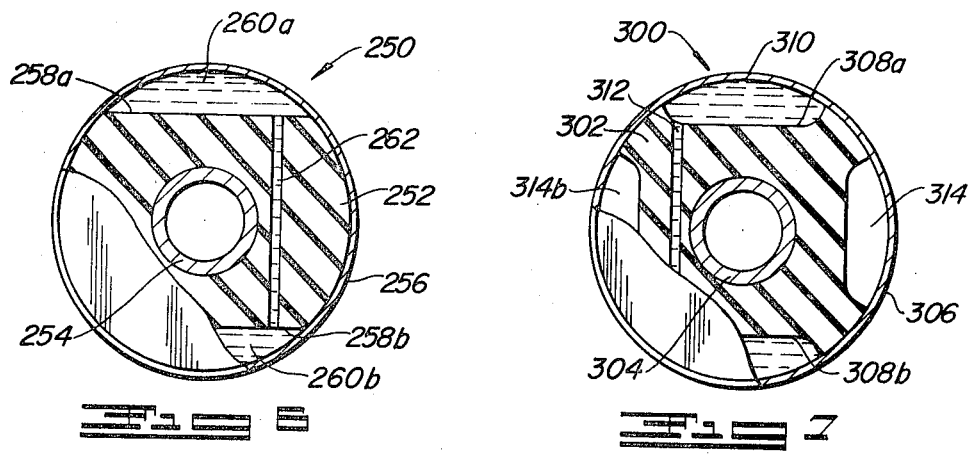
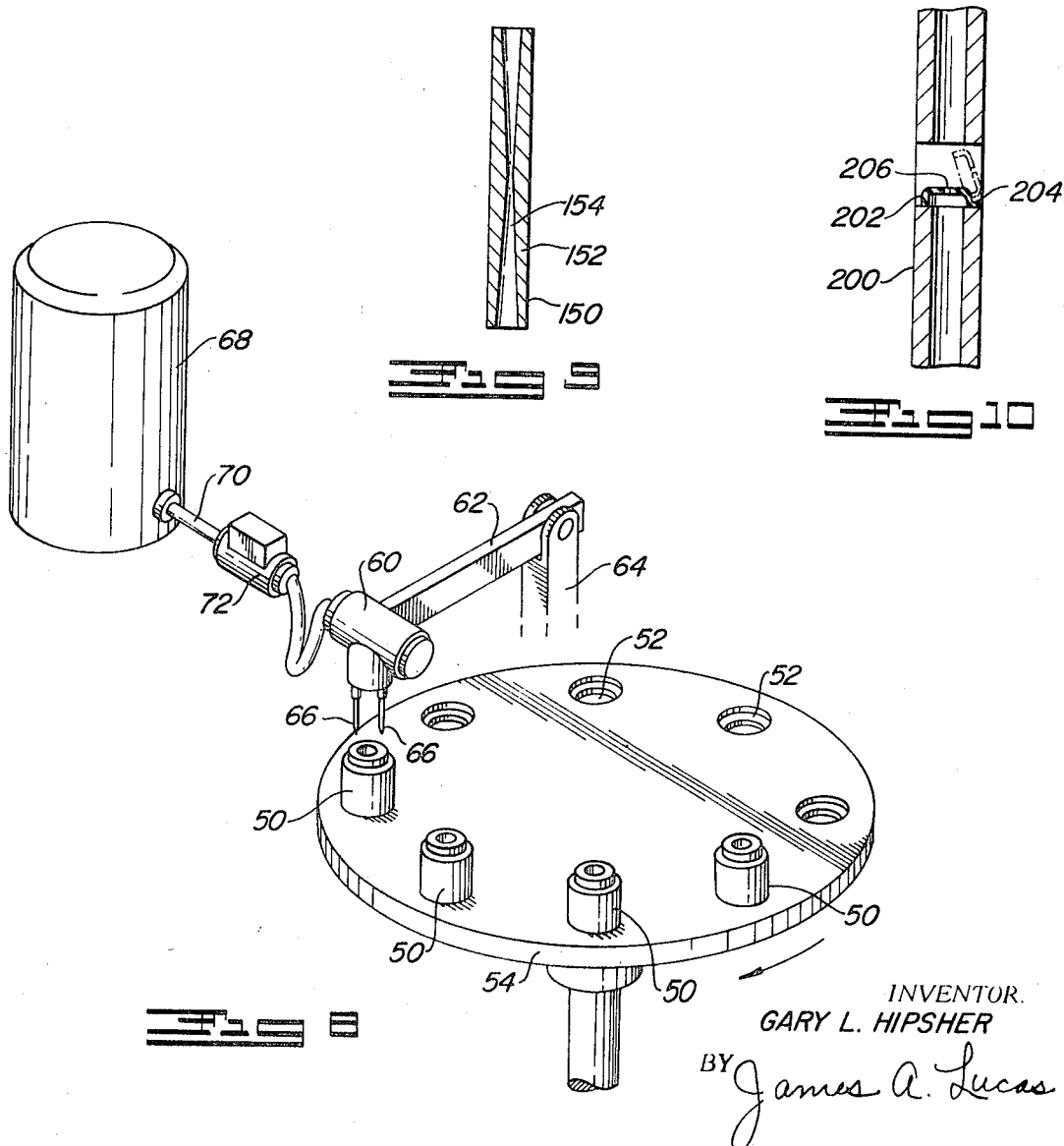
INVENTOR.
GARY L. HIPSHER
BY James A. Lucas
ATTORNEY

HIGH-DAMPING RESILIENT BUSHING

CROSS-REFERENCE TO RELATED APPLICATIONS

This application is a continuation-in-part of application Ser. No. 755,268 filed on Aug. 26, 1968, now abandoned.

BACKGROUND OF THE INVENTION

As more time and effort has been devoted to minimizing vibration and controlling harmonics in automotive vehicles while optimizing comfort and ride characteristics, the design of various vibration isolators and bushings has become more sophisticated. Early bushings were produced by inserting an uncured molded elastomer between a pair of concentric metal sleeves. The elastomer was then cured and during curing became bonded to the sleeves. The curing also served to relieve internal stresses within the elastomer. Later it was found that the load-bearing capacity of this type of bushing could be increased by assembling precured elastomeric inserts, under substantial radial compression, between the two sleeves. Still later, it was found that pockets or recesses could be molded into the elastomeric insert to provide a bushing having spring rates and vibration-absorbing capabilities which were different in one radial direction than in the other radial direction. Typical of this type of bushing are those shown in the Wolf patent U.S. Pat. No. 3,147,964 and the Miller-Wolf patent U.S. Pat. No. 3,082,999, both owned by the assignee of the present invention. Further refinements included molding an insert from two or more elastomers of different hardnesses to provide a bushing having differing axial and radial rates.

It is seen that the manufacture of these various multiple rate bushings involves the use of elastomers of differing hardnesses, with the use of high durometer materials for low-frequency vibration isolation and low durometer or soft materials for the higher frequencies, or the judicious use of pockets or areas of relief to vary the amount of rubber in one radial direction from that in the other radial direction as exemplified by the aforementioned Wolf patent. This last approach provides a bushing with a low dynamic spring rate and low damping in the direction through the pockets and a considerably higher spring rate in a direction perpendicular thereto.

SUMMARY OF THE INVENTION

The present invention relates to means for further improving certain of the performance characteristics of elastomeric bushings of the type comprising an elastomeric insert radially compressed between a pair of concentric sleeves including forming pockets in the outer surface of the insert, introducing an appropriate fluid into the pockets and providing for fluid communication between said pockets. The fluid is one which has good damping properties, or which is otherwise capable of absorbing or reducing vibrational energy.

One of the objects of the present invention is a means for providing an elastomeric bushing having high damping characteristics.

Another object is a bushing having these high damping characteristics in one radial plane through the bushing.

Another object is the use of a fluid medium and the movement thereof to control the damping in a resilient bushing.

Yet, another object is a high damping resilient bushing wherein the flow of fluid through an orifice from one pocket to the other provides the means for controlling the high damping characteristics of said bushing.

BRIEF DESCRIPTION OF THE DRAWINGS

These and other objects are accomplished in the manner to be hereinafter described, with particular reference to the drawings, wherein FIG. 1 is a partial cutaway view of an assembled bushing of the type covered by the present invention;

FIG. 2 is a view, partially in cross section, of a molded insert before assembly;

FIG. 3 is a view along lines 3—3 of FIG. 2;

FIG. 4 is a partial view, similar to that of FIG. 3 with a tube inserted in the passage between the pockets;

FIG. 5 is an end view, partially in cross section, of a modification of the present invention wherein an outer elliptical sleeve cooperates with a groove in the outer surface of the insert to provide an interconnection between pockets;

FIG. 6 is yet another view in partial cross section showing a variation in the shape of the fluid-filled pockets;

FIG. 7 is an end view, partially in cross section of another modification;

FIG. 8 is a schematic diagram of one means of introducing fluid into the reservoirs or pockets of an assembled bushing;

FIG. 9 is an enlarged cross-sectional view of one type of constricted flow orifice that can be used in the bushing of the present invention; and FIG. 10 shows yet another variation utilizing a simple flapper valve in the tube.

DESCRIPTION OF THE PREFERRED EMBODIMENTS

This invention relates to a high damping bushing including an inner rigid sleeve, an outer rigid sleeve concentrically disposed therearound and a cured elastomeric insert radially compressed therebetween. The outer surface of said insert, in contact with the outer sleeve, defines a pair of pockets in which is disposed a fluid having a viscosity and other physical properties commensurate with the design requirements of the bushing. Means are provided for restricted movement of this fluid between the pockets.

FIG. 1 shows a bushing, typically of the kind used to interconnect, yet isolate, two parts such as an engine and the frame of a car. This bushing 2 consists of an inner sleeve 4, preferably fabricated out of metal tubing, an outer sleeve 6, and an elastomeric insert 8 radially compressed therebetween. The insert contains a pair of recesses which cooperate with the outer sleeve to form pockets, 10a and 10b, each of which contains a suitable fluid 12. A tube 14, connecting the two pockets, permits fluid to flow from one pocket to the other when relative movement between the inner and outer sleeves, in the plane passing through the pockets causes a reduction in volume of one of the pockets. This reduction is accompanied by a corresponding increase in the dimensions of the other pocket whereupon the fluid is forced or pumped under pressure from the contracted pocket through the tube 14 to the expanded pocket. The insert as molded and before assembly is shown in FIG. 2. It is molded with an axially extending annulus 22 therethrough. The ends 24a, 24b as molded are normally slightly dish shaped. The radial outer surface of the insert is composed of a pair of shoulders 26a, 26b, a pair of circumferentially continuous land portions 28a, 28b and a pair of recesses 30a, 30 b. The insert is composed of a suitable natural or synthetic elastomer formulated with fillers, oils, curatives and other ingredients to impart the desirable characteristics to the final product and compounded so as to have a Shore A Durometer hardness of between about 40 and 65. The insert is normally molded and cured in a suitable mold such as an injection mold. As molded the diameter of the annulus 22 is smaller than the outer diameter of the inner metal 4, and the diameter of the circumferentially continuous lands 28a, 28b, is greater than the inner diameter of the outer sleeve 6. Accordingly, when the insert is assembled between two sleeves, it undergoes substantial radial compression, accompanied by corresponding axial elongation. Thus, the axial length of the insert as molded is substantially less than its length in the final assembly to compensate for this elongation. The insert is radially compressed at least about 10 percent, and sometimes as much as 30 or 40 percent. The radial forces of restoration of the insert serve to hold it in place between the inner and outer sleeves and to prevent slipping even when the bushing is subjected to substantial axial, radial and rotational forces.

A narrow passage is molded into the insert preferably by the use of locating pins within the mold. Such a passage or orifice is shown in FIG. 3, representing a cross section of a molded insert taken along lines 3—3 of FIG. 2. This passage 32 interconnects the recesses 30a, 30b and permits the movement of fluid from one pocket to the other. To obviate the possibility that the passageway will become pinched or otherwise blocked during or after assembly of the bushing, a tube 34 is inserted into the passageway as shown in FIG. 4. This tube may be fabricated out of metal, Teflon, Delrin, cured hard Butyl rubber or other similar material and is typically inserted into place within the passageway before the rubber insert is assembled into the bushing.

The bushing of the present invention can be assembled according to conventional techniques using standard assembly machines. For example, the elastomeric insert can be pushed through a tapered conduit into the outer sleeve after which the inner sleeve, mounted on an elongated tapered mandrel is forced into place within the annulus of the insert. To facilitate the assembly, a suitable lubricant is normally used.

As previously mentioned, the insert, after assembly, is under substantial radial compression and exerts a radially outward and inward force against the two sleeves. When the bushing is subjected to torsion, as when relative angular movement occurs between the outer and inner sleeves, this radial force of the insert prevents or minimizes slipping between the components. To further increase the resistance to slipping, the insert can be bonded with a suitable adhesive to one or both sleeves. These are several types of adhesive systems that can be used for this purpose. Typical is that described in U.S. Pat. No. 3,387,839 owned by the assignee of the present invention entitled "Adhesive Bonded Bushing and Method of Making Same."

Following the assembly of the bushing and bonding of the insert to the inner and outer sleeves, the fluid is introduced into the pockets. There are a number of suitable fluids that can be used in practicing the teachings of the present invention. These fluids must be compatible with the rubber and the metal and should be otherwise stable and inert, and capable of maintaining uniform viscosities over a wide range of temperature. Typical examples are various glycols such as polyalkaline glycols, alone or admixed with water, silicone fluids and low molecular weight polymers possessing behaviorial characteristics of a good damping fluid.

FIG. 8 shows one way in which the fluid can be introduced into the cavities. A plurality of bushings 50 are placed in recesses 52 on a rotating holder 54. An injection head 60 is attached to a pivot arm 62 mounted in an upright 64 and contains a pair of hollow needles such as hypodermic needles 66. Damping fluid is supplied from a reservoir 68 through lines 70 and a metering pump 72 to the injection head 60. One of the needles injects a measured amount of the fluid sufficient to completely fill both of the pockets and the communicating passageway while the other needle bleeds the displaced air from the pockets. The needles are withdrawn after which the holder is rotated to locate another bushing in position for injection of fluid. The various steps in this operation including positioning and removing the bushing on the holder, locating the bushing under the needles and insertion of the needles in the elastomer can be carried out manually or automatically.

The insert is under sufficient radial compression so that when the needles are withdrawn the holes are completely closed thus preventing loss of fluid even under operating conditions involving high temperatures and pressures. As previously mentioned, the insert is preferably bonded at least to the outer sleeve and thus the entire periphery around the pocket is in pressure contact with and is bonded to this sleeve thus insuring that no leakage of fluid occurs between the insert and the sleeve.

The following example is presented to permit a clearer understanding of the present invention. A number of elastomeric inserts were prepared from a natural rubber compound in the following manner: 100 parts of No. 1 smoked sheet were blended with 14 parts of carbon black along with minor amounts of activators, retarders, and plasticizers in a Banbury mixer. To this master batch was then added a curing agent along with accelerators and an antioxidant following which the inserts were formed into shape by injection molding. The inserts were all cured in the usual manner at elevated temperatures to a hardness of about 52 Durometer. They were similar in appearance to the insert shown in FIGS. 2 and 3. The approximate dimensions of the molded inserts were as follows:

| | |
|---|---|
| Overall length | 2.75 inches |
| Maximum diameter | 1.98 inches |
| Diameter of annulus | 0.65 inch |
| Recesses | |
| axial length | 1.55 inches |
| radial length | 90° |
| depth | 0.31 inch |
| Passage between recesses: | |
| Diameter | 0.125 inch |

A Delrin tube was inserted in each of the passages of each insert each of these tubes having different inner diameters.

The metal sleeves were thoroughly cleaned, degreased and then primed with a halogenated rubber in a solvent. They were heated slightly to remove the solvent after which an adhesive layer of a di-isocyanate and a chlorinated nitrile rubber was applied to the sleeves on the surfaces that were to eventually contact the rubber insert. The rubber inserts were cleaned and with the aid of a lubricant were assembled between the inner and outer sleeves. After a period of about 24 hours during which time the lubricant was removed from the interface between the insert and the sleeves, primarily through absorption into the rubber, the bushings were heated to activate the adhesive and develop a bond between the rubber and the metal. Some were heated at 285° F. for 45 minutes in a forced air furnace while others were immersed for 2 minutes in a salt bath at a temperature of 400° F. A silicone oil, sold under the trademark DC-200 and having a viscosity of 50 centistokes, a pour point of −94° F. and an open cup flash point of 545° F. and a specific gravity at 77° F. of 0.960 was injected into the cavities of all but one of the bushings. Each of the completed bushings was 3.12 inches long, had an outer diameter of 2.0 inches and an inner diameter of about 0.63, and was similar in appearance to the bushing shown in FIG. 1.

The bushings were individually tested in a resonant beam dynamic rate tester, which comprises a horizontal beam pivoted at one end and provided at the opposite end with means such as an electrodynamic vibration exciter for transmitting a dynamic load to the bushing. The bushing was mounted between the ends of the beam and a static load of 307 pounds was applied in the radial direction. During the test, the amplitute of displacement of the bushing was 0.012 inch. The various dynamic properties of each bushing were measured and recorded. From these were calculated the dynamic spring rate ($K_d$) in pounds per inch and the damping coefficient (C) in pound-seconds per inch.

It should be understood that the dynamic rate of each bushing in the radial direction at right angles to the pockets is relatively unaffected by the type or nature of the fluid and is directly dependent upon the type and nature of the elastomer in the insert. For these samples, the average solid side value for $K_d$ was 11,159 and for C was 7.48.

The following table shows the change in value for $K_d$ and C as the diameter of the orifice between the pockets is increased. For a bushing containing no fluid, the dynamic rate through the pockets was 4,614 and the damping factor was 5.21. For the bushings containing the silicone oil the values were as follows:

| Orifice Diameter (inches) | $K_d$ (pounds/in.) | C (pound-sec.)/in. |
|---|---|---|
| 0.031 | 12356 | 11.50 |
| 0.047 | 11595 | 31.07 |
| 0.055 | 10735 | 44.28 |
| 0.063 | 10181 | 61.05 |
| 0.078 | 6680 | 41.10 |
| 0.094 | 5043 | 16.81 |

These results show that as the size of the interconnecting orifice increases, the dynamic spring rate decreases while the damping coefficient initially increases, and thereafter decreases. In all instances, the damping coefficient was at least twice as great as it was in the bushing containing no damping fluid. These results suggest that the various dynamic rates of the bushing can be readily controlled through the judicious selection of a properly sized orifice between the pockets.

Further tests showed that as the amplitude of the displacement was increased at a given orifice size, $K_d$ and C decreased where the orifice diameter was small and became larger at larger diameters.

It should be understood that other factors can be varied to adapt the bushing to a variety of circumstances. For instance, the type of rubber and compounding ingredients, the size, shape and location of the pockets as well as the type, viscosity and other properties of the fluid are all factors to be considered.

As previously stated the elastomeric insert is molded so as to have a Durometer hardness of between about 40 and about 65. Lower Durometer inserts have low hysteresis and provide good noise isolation, at relatively high-frequency vibrations. Good elastomers for this purpose are terpolymers of ethylene propylene diene monomer (EPDM) and natural rubber which has the added advantage of long life. The rubber is generally blended with little or no oil and a relatively small amount of carbon black. Elastomers having properties of high hysteresis may be produced from butadiene acrylonitrile copolymers or butyl rubber. These high-hysteresis elastomers have a great ability to absorb low-frequency vibration, of the type that occur below the audible range and that are sensed or felt rather than heard. The hysteresis of the rubber can further be increased by increasing the amount of carbon black without increasing the high-frequency transmission of the rubber. Greater amounts of oil also serve to increase the damping characteristics of the rubber. Elastomers such as Neoprene and styrene butadiene rubber (SBR) are considered to have properties midway between low-hysteresis and high-hysteresis elastomers.

The fluid that is used in the reservoirs or the pockets of the insert is preferably viscous, stable and inert. As previously mentioned, silicone fluids, polyglycols, and low molecular weight polymers such as polyisobutylenes are suitable for this purpose. However, it should be understood that other inert fluids including hydraulic oils may also be used, particularly where very high damping characteristics are not of prime importance. Although preferably made of metal the inner and outer sleeves can be fabricated from rigid plastic or the like. The outer sleeve and/or the insert can be flanged at one or both ends, rather than being uniformly cylindrical as shown in FIG. 1.

The dimensions and locations of the pockets or reservoirs can be changed without departing from the spirit of the present invention. Normally these pockets are diametrically opposite one another. They have an axial length of between one-third and two-thirds of the total length of the insert and have a circumferential angular width of between about 60° and about 120°. The pockets should be of such depth as to prevent bottoming out which occurs when the outer sleeve contacts the bottom of the pocket under severe radial deflection. Normally a depth of between one-third and three times the radial thickness of the rubber at the bottom of the pocket is sufficient. The dimensions of the pockets are normally equal; however, it should be understood that one pocket can be smaller that the other to give a radial rate in one direction different than that in the diametrically opposed direction. A bushing of this type is shown and described in U.S. Pat. application Ser. No. 643,213 filed July 13, 1967 by D. Deane and entitled "Closed-End Triple-Rate Bushing," which application is owned by the assignee of the present invention. Instead of 180° apart the pockets can be spaced at a lesser angle to thereby provide a bushing with high damping characteristics in those angular directions through the pockets. Furthermore, more than two interconnected pockets can be employed. For example, three pockets can be spaced equally around the insert to give high damping in radial directions 120° apart.

Other modifications of the invention are shown in FIGS. 6 and 7. In FIG. 6, the bushing 250 is composed of an insert 252 radially compressed between an inner sleeve 254 and an outer sleeve 256. The normally cylindrical outer surface of the insert is beveled to provide two flat portions or lands 258a and 258b between the ends of the insert which lands cooperate with the outer sleeve 256 to form two pockets 260a and 260b on opposite sides of the bushing. These pockets are filled with fluid and are connected by an orifice 262. The lands may be molded into the insert; alternatively, they may be formed by cutting or abrading the outer surface of the insert to the proper contour. Likewise, the orifice may be molded into the insert or it may be bored or drilled through the insert after molding.

A typical bushing of the above-mentioned type includes an insert having a nominal outer diameter of 2 inches before assembly and a pair of oppositely disposed recesses in the outer surface wherein the maximum depth of each recess is 0.35 inches, said recesses joined by a hole drilled through the insert with a 0.109-inch drill. The insert is radially compressed about 20 percent and is assembled between two concentric metal sleeves after which the pockets formed by the outer sleeve and the recesses are filled with silicone fluid. The dynamic spring rate of the bushing through the pockets is about 4,000 lb./inch at 0.012 inch deflection while the rate in the direction 90° radially disposed thereto is about 8,200 lb./inch. The damping coefficient through the pockets at the same deflection is about 17.5 lb.-sec./in. while the coefficient 90° therefrom is less than 5 lb.-sec./in.

FIG. 7 shows another variation wherein the bushing is provided with voids in the low damping direction to reduce the dynamic and static spring rate of the bushing in this direction. The low damping direction is typically located 90° away, radially, from the high damping direction through the fluid-filled pockets. The bushing 300 is composed of the assembled components of an elastomeric insert 302 radially compressed between an inner sleeve 304 and an outer sleeve 306. The insert contains two recesses 308 that cooperate with the outer sleeve to form pockets containing a suitable fluid 310. An orifice 312 joins the two pockets. Two additional recesses 314a and 314b are located at right angles to the fluid-filled pockets and serve to lower the radial spring rate in the direction perpendicular to the pockets. These recesses or voids may form pockets or passageways that take any of the shapes shown in the aforementioned Wolf or Wolf-Miller patents or the Deane application. Conversely, the pockets may also be filled with a fluid and may be interconnected with an orifice to provide high damping in four directions 90° apart from one another. This provides means whereby the spring rate and other dynamic properties of the bushing can be selectively controlled.

An oval bushing having a major diameter of about 2.15 inches and a minor diameter of about 1.75 inches is composed of a molded rubber insert having a Durometer hardness of 46, radially compressed between two sleeves. The bushing contains a pair of fluid filled pockets formed by the insert and outer sleeve in the direction of the major diameter, said pockets joined to one another by a 0.094 inch ID hard rubber tube. Tests indicated that the dynamic spring rate and damping coefficients through these pockets at 0.012 deflection were about 2,500 lb./in. and 7 lb.-sec./ins. respectively while these figures in the direction through the solid side were 6,000 lb./in. and 4 lb.-sec./in. Modifying the bushing by providing slots, 0.75 inch wide and 0.30 inch deep along the entire length of the sides of the insert lowered the spring rate in this direction to about 1,800 lb./in. and the coefficient to 1.6 lb.-sec./in. Thus, voiding the sides of the bushing resulted in a marked decrease in the dynamic spring rate and the damping coefficient in the direction through the voids.

Adverting again to the drawings, FIG. 5 shows a bushing with modified orifice suitable for use with a high damping fluid in accordance with the teachings of the present invention. This bushing 100 generally of oval construction, is composed of three component parts; an inner sleeve 102, an elastomeric insert 104 and an outer sleeve 106 with a flange 112 at one end. The insert is provided with a pair of pockets 108a, 108b and contains a groove 110 molded in the outer surface thereof, said groove cooperating with the outer sleeve 106 to form a channel between the two pockets 108a, 108b. This channel provides for fluid communication between the two pockets in the same manner as has been heretofore described.

FIG. 9 is respresentative of another embodiment of the invention wherein the tube, adapted to regulate the flow rate of the fluid between the two fluid containing reservoirs, is provided with a restrictive taper. This type of tube would give damping characteristics similar to a corresponding tube having a uniform diameter corresponding to the minimum diameter of the construction modified, however, by the effect of the taper on the flow of the fluid through the tube.

FIG. 10 is respresentative of further means for regulation and/or control of the flow of fluid from one pocket to the other through use of a rubber or plastic flapper valve. In this figure a tube 200 is provided with a flapper valve 202 joined by hinge 204 to the tube and adapted to rest on a valve seat. Fluid pressure against the underside of the valve 202 causes it to open and permits the relatively unrestricted passage of fluid therethrough until the pressures on both sides of the valve are equalized. Fluid pressure in the opposite direction will cause the valve to close. A small bleeder hole 206 in the valve prevents the buildup of excess pressure, and functions as an orifice for high damping in that direction. This type of fluid flow control can be used, for instance, in a suspension system which requires low damping of the wheel in one direction and high damping in the opposite direction.

Although the invention has been described with reference to specific configurations and embodiments, it should be understood that there are many other permissible deviations that could be made without departing from the scope of the present invention, as delimited by the claims in which I claim:

1. A resilient bushing including a tubular rigid inner sleeve, a tubular rigid outer sleeve disposed around and radially spaced from said inner sleeve, and a cured annular elastomeric insert radially compressed between the two sleeves said insert having a plurality of separate recesses that form pockets that are separated from one another, a fluid filling at least two of said pockets and means providing restricted fluid communication between the fluid filled pockets whereupon the bushing exhibits high damping in the radial direction through the fluid-filled pockets.

2. The bushing according to claim 1 wherein said fluid-filled pockets are defined by the inner wall of the outer rigid sleeve and by recesses formed in the outer surface of the elastomeric insert.

3. The bushing according to claim 2 wherein the insert is bonded to the outer sleeve.

4. The bushing according to claim 1 wherein the bushing contains two fluid filled pockets that are diametrically opposed to one another.

5. The bushing according to claim 4 wherein said two pockets are of equal dimensions.

6. The bushing according to claim 4 wherein each pocket has an axial length of between about one-third and two-thirds the length of the bushing and has an angular width of between about 60° and about 120° around the periphery thereof.

7. The bushing according to claim 1 wherein said damping fluid is selected from the group consisting of silicone oil, polyglycols alone or admixed with water, and low molecular weight polymers.

8. The bushing according to claim 1 wherein the fluid passageway between pockets contains a fluid flow restriction means.

9. The bushing according to claim 8 wherein said resitriction means comprises a flapper valve.

10. The bushing according to claim 4 wherein the outer surface of the insert is provided with voids in the low damping direction.

11. The bushing according to claim 10 wherein these voids extend the entire length of the bushing.

12. The bushing according to claim 10 wherein these voids are pockets formed by the outer sleeve and recesses in the insert.

13. A resilient bushing comprising inner and outer radially spaced rigid sleeves, and a cured annular elastomeric insert radially compressed between the sleeves, said insert having a pair of diametrically opposed recesses in its outer surface, which recesses cooperate with the outer sleeve to form fluid-containing pockets, fluid in said pockets and means for permitting the restricted flow passage of fluid from one pocket to the other pocket, resulting in a high coefficient of damping in the radial direction through the pockets.

14. The bushing according to claim 13 wherein the insert contains voids in its outer surface radially disposed 90° from the fluid-filled pockets.

15. The bushing according to claim 13 wherein the recesses are molded in to the outer surfaces of the insert.

16. The bushing according to claim 13 wherein the means for permitting restricted flow of fluid comprises an orifice interconnecting the two pockets.

* * * * *